US012706085B2

(12) United States Patent
Plantinga et al.

(10) Patent No.: US 12,706,085 B2
(45) Date of Patent: Aug. 11, 2026

(54) SYSTEMS AND METHODS FOR CONTINUAL LEARNING FOR END TO-END AUTOMATIC SPEECH RECOGNITION

(71) Applicant: JPMORGAN CHASE BANK, N.A., New York, NY (US)

(72) Inventors: Peter Plantinga, Columbus, OH (US); Jaekwon Yoo, New York, NY (US); Chandra Dhir, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 199 days.

(21) Appl. No.: 18/442,974

(22) Filed: Feb. 15, 2024

(65) Prior Publication Data

US 2024/0290319 A1 Aug. 29, 2024

Related U.S. Application Data

(60) Provisional application No. 63/487,560, filed on Feb. 28, 2023.

(51) Int. Cl.
*G10L 15/06* (2013.01)

(52) U.S. Cl.
CPC .... *G10L 15/063* (2013.01); *G10L 2015/0635* (2013.01)

(58) Field of Classification Search
CPC .................... G10L 15/063; G10L 2015/0635; G10L 15/16
See application file for complete search history.

(56) References Cited

U.S. PATENT DOCUMENTS

| | | | | |
|---|---|---|---|---|
| 11,450,225 | B1 * | 9/2022 | Kilari | G06F 40/30 |
| 2009/0161746 | A1 * | 6/2009 | Mirbagheri | H04L 25/03114 375/346 |
| 2011/0173052 | A1 * | 7/2011 | Deshpande | G06Q 10/06398 706/54 |
| 2015/0058019 | A1 * | 2/2015 | Chen | G10L 13/08 704/260 |
| 2019/0034795 | A1 * | 1/2019 | Zitouni | G06N 3/044 |
| 2019/0250203 | A1 * | 8/2019 | Ali | H02H 1/0092 |
| 2019/0311529 | A1 * | 10/2019 | Lacey | G06T 17/20 |
| 2021/0082399 | A1 * | 3/2021 | Kurata | G06N 3/084 |
| 2022/0335269 | A1 * | 10/2022 | Zhang | G06N 3/02 |
| 2023/0021338 | A1 * | 1/2023 | Ahuja | G06N 3/0475 |

(Continued)

*Primary Examiner* — Michael Colucci
(74) *Attorney, Agent, or Firm* — GREENBERG TRAURIG LLP

(57) ABSTRACT

In some aspects, the techniques described herein relate to a method including: providing, to a parallel model training platform, a plurality of domain datasets; training, by the parallel model training platform, a plurality of generalist models in parallel, wherein each generalist model of the plurality of generalist models is trained in parallel using a corresponding one of the plurality of domain datasets, and wherein training the plurality of generalist models in parallel generates a corresponding expert model for each generalist model in the plurality of generalist models; executing, by the parallel model training platform, a model parameter averaging process, wherein the model parameter averaging process take each corresponding expert model as input; and generating, by the parallel model training platform and as output of the model parameter averaging process, an average-of-domain-experts (AoDE) model.

11 Claims, 3 Drawing Sheets

(56) References Cited

U.S. PATENT DOCUMENTS

| | | | | |
|---|---|---|---|---|
| 2023/0033768 | A1* | 2/2023 | Chong | G10L 15/063 |
| 2023/0036352 | A1* | 2/2023 | Nakov | G06F 40/205 |
| 2023/0040777 | A1* | 2/2023 | Chen | A63F 13/52 |
| 2023/0105931 | A1* | 4/2023 | Van der Auwera | G06T 9/001<br>382/232 |
| 2023/0135163 | A1* | 5/2023 | Morton | G06N 3/045<br>706/12 |
| 2023/0140828 | A1* | 5/2023 | Durvasula | G06N 5/046<br>705/7.37 |
| 2023/0196117 | A1* | 6/2023 | Du | G06F 18/214<br>382/155 |
| 2023/0259761 | A1* | 8/2023 | Lee | G06N 3/096<br>706/20 |
| 2023/0297894 | A1* | 9/2023 | Goto | G06V 10/774<br>706/12 |
| 2024/0038238 | A1* | 2/2024 | Qin | G06V 10/806 |
| 2024/0212684 | A1* | 6/2024 | Sridhar | G06F 16/3343 |
| 2024/0220848 | A1* | 7/2024 | Mahmud | G06N 20/00 |
| 2025/0124298 | A1* | 4/2025 | Ebrahimi | G06N 3/0985 |

* cited by examiner

Generalist Model 120

Generalist Model 122

Generalist Model 124

Model Training Engine 130

Domain Dataset 140

Model Training Engine 132

Domain Dataset 142

Model Training Engine 134

Domain Dataset 144

Expert Model 150

Expert Model 152

Expert Model 154

Model Averaging Engine 160

AoDE Model 170

Parallel Model Training Platform 110

SYSTEMS AND METHODS FOR CONTINUAL LEARNING FOR END TO-END AUTOMATIC SPEECH RECOGNITION

This application claims the benefit of U.S. Provisional Patent Application Ser. No. 63/487,560, filed Feb. 28, 2023, the disclosure of which is hereby incorporated, by reference, in its entirety.

BACKGROUND

1. Field of the Disclosure

Aspects generally relate to systems and methods for continual learning for end to-end automatic speech recognition.

2. Description of the Related Art

Continual learning for end-to-end automatic speech recognition has to contend with a number of serious difficulties. A straightforward strategy of serially training and fine-tuning models tends to produce a loss of performance on data already seen, a process known as catastrophic forgetting. On the other hand, strategies that freeze parameters and append additional tunable parameters must maintain multiple sets of parameters.

SUMMARY

In some aspects, the techniques described herein relate to a method including: providing, to a parallel model training platform, a plurality of domain datasets; training, by the parallel model training platform, a plurality of generalist models in parallel, wherein each generalist model of the plurality of generalist models is trained in parallel using a corresponding one of the plurality of domain datasets, and wherein training the plurality of generalist models in parallel generates a corresponding expert model for each generalist model in the plurality of generalist models; executing, by the parallel model training platform, a model parameter averaging process, wherein the model parameter averaging process take each corresponding expert model as input; and generating, by the parallel model training platform and as output of the model parameter averaging process, an average-of-domain-experts (AoDE) model.

In some aspects, the techniques described herein relate to a method, wherein each of the plurality of generalist models is a copy of a single generalist model.

In some aspects, the techniques described herein relate to a method, including: executing, by the model parameter averaging process, a linear interpolation of model parameters of each corresponding expert model.

In some aspects, the techniques described herein relate to a method, including: executing, by the model parameter averaging process, a non-linear interpolation of model parameters of each corresponding expert model.

In some aspects, the techniques described herein relate to a method, wherein the model parameter averaging process uses an equal weighting of each corresponding expert model.

In some aspects, the techniques described herein relate to a method, wherein one of the plurality of domain datasets is a random sampling of a larger domain dataset.

In some aspects, the techniques described herein relate to a method, wherein one of the plurality of domain datasets is divided into time segments that do not exceed a threshold value.

In some aspects, the techniques described herein relate to a system including at least one computer including a processor and a memory, wherein the at least one computer is configured to: provide, to a parallel model training platform, a plurality of domain datasets; train, by the parallel model training platform, a plurality of generalist models in parallel, wherein each generalist model of the plurality of generalist models is trained in parallel using a corresponding one of the plurality of domain datasets, and wherein training the plurality of generalist models in parallel generates a corresponding expert model for each generalist model in the plurality of generalist models; execute, by the parallel model training platform, a model parameter averaging process, wherein the model parameter averaging process take each corresponding expert model as input; and generate, by the parallel model training platform and as output of the model parameter averaging process, an average-of-domain-experts (AoDE) model.

In some aspects, the techniques described herein relate to a system, wherein each of the plurality of generalist models is a copy of a single generalist model.

In some aspects, the techniques described herein relate to a system, wherein the at least one computer is configured to: execute, by the model parameter averaging process, a linear interpolation of model parameters of each corresponding expert model.

In some aspects, the techniques described herein relate to a system, wherein the at least one computer is configured to: execute, by the model parameter averaging process, a non-linear interpolation of model parameters of each corresponding expert model.

In some aspects, the techniques described herein relate to a system, wherein the model parameter averaging process uses an equal weighting of each corresponding expert model.

In some aspects, the techniques described herein relate to a system, wherein one of the plurality of domain datasets is a random sampling of a larger domain dataset.

In some aspects, the techniques described herein relate to a system, wherein one of the plurality of domain datasets is divided into time segments that do not exceed a threshold value.

In some aspects, the techniques described herein relate to a non-transitory computer readable storage medium, including instructions stored thereon, which instructions, when read and executed by one or more computer processors, cause the one or more computer processors to perform steps including: providing, to a parallel model training platform, a plurality of domain datasets; training, by the parallel model training platform, a plurality of generalist models in parallel, wherein each generalist model of the plurality of generalist models is trained in parallel using a corresponding one of the plurality of domain datasets, and wherein training the plurality of generalist models in parallel generates a corresponding expert model for each generalist model in the plurality of generalist models; executing, by the parallel model training platform, a model parameter averaging process, wherein the model parameter averaging process take each corresponding expert model as input; and generating, by the parallel model training platform and as output of the model parameter averaging process, an average-of-domain-experts (AoDE) model.

In some aspects, the techniques described herein relate to a non-transitory computer readable storage medium, wherein each of the plurality of generalist models is a copy of a single generalist model.

In some aspects, the techniques described herein relate to a non-transitory computer readable storage medium, including: executing, by the model parameter averaging process, a linear interpolation of model parameters of each corresponding expert model.

In some aspects, the techniques described herein relate to a non-transitory computer readable storage medium, including: executing, by the model parameter averaging process, a non-linear interpolation of model parameters of each corresponding expert model.

In some aspects, the techniques described herein relate to a non-transitory computer readable storage medium, wherein the model parameter averaging process uses an equal weighting of each corresponding expert model.

In some aspects, the techniques described herein relate to a non-transitory computer readable storage medium, wherein one of the plurality of domain datasets is a random sampling of a larger domain dataset.

DETAILED DESCRIPTION

Figure 1:
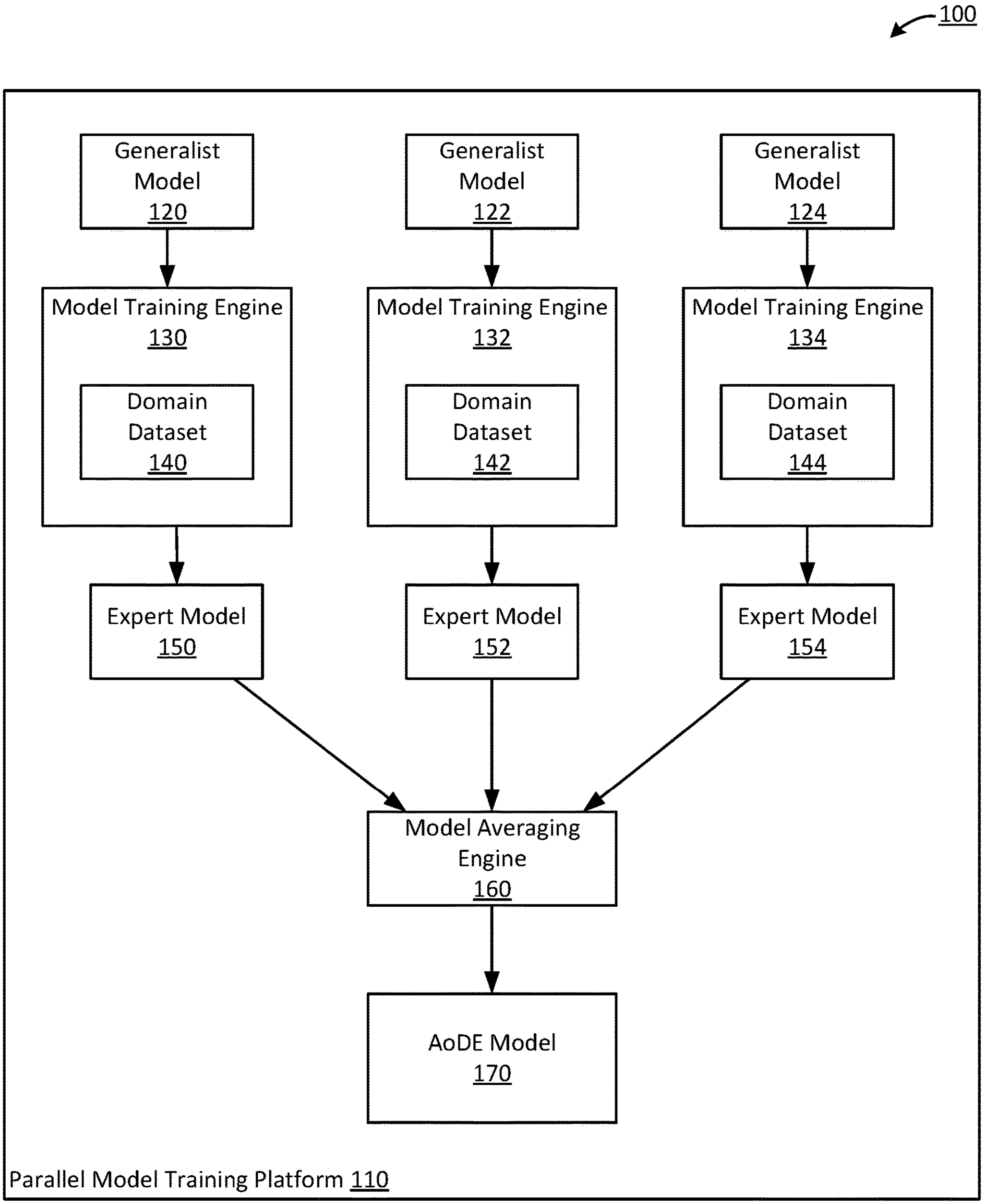
FIG. 1 illustrates a block diagram os a system for continual learning in end to-end automatic speech recognition models, in accordance with aspects.

Aspects generally relate to systems and methods for continual learning for end to-end automatic speech recognition.

Modern end-to-end automatic speech recognition (E2E-ASR) systems have achieved impressive results across a variety of data by training on massive datasets (e.g., up to 700,000 hours of audio data). While these generalist models often perform surprisingly well on domains they have never seen in a zero-shot manner, for specific applications they can still benefit tremendously from finetuning on data from the target domain.

An exemplary strategy for fine-tuning E2E-ASR systems involves standard gradient descent updates to model parameters using data from the target domain. However, this strategy usually suffers reduced performance on data from the original domain, a process known as catastrophic forgetting. While in some situations it may be possible to maintain different parameters for different domains this has the downside of adding complexity and taking up storage space, especially for large models. In addition, it may not be clear for all cases which domain a target sample falls into.

This difficulty has been addressed with special attention paid to certain parameters, either by freezing some parameters or by adding loss regularization designed to reduce forgetting. These techniques, however, have met mixed success with mitigating model forgetting; serial fine-tuning processes on new data domains still often results in decreased performance on the original data.

These noted challenges have also been addressed by freezing the entirety of the good-performing generalist model and adding domain-specific parameters. One popular technique along these lines is called "Adapters," which involves freezing original model parameters and updated small modules inserted with a starting configuration which preserves the behavior of the original model. A weakness of this approach, however, is that multiple sets of parameters must be maintained, and at inference a decision must be made about which set to use.

Another technique involves replaying data from the original domain. This approach may work well when the original data is available but retention of these dataset is not always possible, especially for pretrained models where the original data is not publicly available.

In accordance with aspects, limitations described above may be addressed by parallelizing the finetuning process and averaging the parameters of fine-tuned expert models. The continual learning paradigm may be reformulated from many serial applications of fine-tuning of a single model into a parallel learning process whereby multiple fine-tuned domain expert models are averaged into a single well-performing model. This may be termed the Paradigm Average of Domain Experts (AoDE).

In accordance with aspects, techniques may maintain a single model for inference (e.g., predictions) while avoiding catastrophic forgetting during training exercises. Aspects may provide a linear interpolation of several expert models' parameters, where each individual expert model is generated from the same generalist model and is fine-tuned on a particular training domain. Aspects may provide (i.e., output) a single model that is trained on various domain datasets that reflect training data based on a particular scenario or group or combination of scenarios (i.e., a particular training "domain"), and that performs well on all data from various training data domains. An exemplary average-of-domain-experts model may perform well on all tested data while suffering almost no loss in performance on data from the domain of original training (i.e., the general domain).

Exemplary models for use with the techniques described herein may include end-to-end speech recognition models. The models may be open-source models and/or pretrained models. Open-source, and/or pretrained models that have not undergone a parallel expert model training process are referred to herein as generalist models. Generalist models may include large end-to-end speech recognition models pretrained on large sets with diverse data. The generality of results may be demonstrated by using unrelated pre-trained models with differing architecture, training loss, data, sponsoring organization, etc. Exemplary pretrained models include the NeMo Conformer CTC Large model and the OpenAI Whisper Small.en model.

The NeMo English Conformer CTC Large model (the "NeMo model") is trained with Connectionist Temporal Classification (CTC) loss and consists of a small downsampling layer followed by 18 convolution plus self-attention blocks and a final output layer. The total number of parameters is 121 million. The tokenizer vocabulary of the NeMo model includes 128 sub-word tokens. All tokens include only lowercase letters, apostrophes, and spaces. The acoustic model is trained on the NeMo ASRset which consists of roughly 25,000 hours of audio from a variety of sources, most of which are publicly available.

The OpenAI Whisper Small.en model he "Whisper Small.en model") is trained using standard sequence-to-sequence cross-entropy loss and consists of two major sub-models, an encoder, and a decoder. The encoder consists of a small downsampling layer followed by 11 self-attention blocks and the decoder consists of 11 multi-headed attention blocks and an output layer. The total number of parameters is 241 million. The Whisper Small.en model uses an English-only tokenizer with the same 50 k-token vocabulary as GPT-2 model. The set of characters present in these tokens is much larger than for NeMo model Conformer, including upper and lower case as well as punctuation. The training data for the Whisper Small.en model consists of roughly 500,000 hours of English-only data present in the OpenAI speech data.

Generalist models may be pretrained on large datasets and may then be fine-tuned in a parallel expert model training process using datasets that reflect a particular scenario, quality, environment, etc. A training dataset that reflects a particular scenario or quality (or groupings thereof) is referred to herein as a domain dataset or a training data domain. Aspects may use a domain dataset to train a generalist model on the particular scenario, quality, etc., reflected in the domain dataset and thereby produce an expert model with respect to the particular scenario, quality, etc., captured in the corresponding domain dataset.

Domain datasets may be selected to cover/represent a variety of scenarios, qualities, sizes, properties, circumstances, etc. That is, a domain dataset may be large, medium, or small in size, may be read speech, conversational speech, etc., may capture a sociolect (i.e., the dialect of a particular social class) or another particular dialect, may include background noise or be clean, and so on. Each dataset that includes a unique combination of scenarios, qualities, etc., may be a domain dataset and may be used to train an expert model on the domain dataset.

An exemplary domain dataset is the SGPISpeech dataset, a publicly available dataset. The SGPISpeech dataset is a large transcription dataset having over 5000 hours of transcribed financial audio (e.g., recordings of earnings calls) with global English accents and varying audio quality. The SGPISpeech recordings are well-transcribed but may be difficult for a generalist model due to a large vocabulary of financial terms that are unlikely to appear elsewhere. The SGPISpeech dataset may be included in an exemplary domain that includes large datasets, transcribed audio, financial terms, and various English dialects)

Another exemplary domain dataset may be the Corpus of Regional African American Language (CORAAL), another dataset that is a publicly available. The CORAAL dataset that includes a conversational dataset between individuals whose primary sociolect is African American Vernacular English (AAVE). Data in the CORAAL dataset was recorded in six separate locations and, in the case of some of the data, over the course of ten years. In total, there are more than 150 interviews at a length surpassing 140 hours of audio. Generalist models have difficulty with the conversational nature of the data and the different grammars of the sociolect. The CORAAL dataset may be included in an exemplary domain that includes medium sized datasets, conversational audio, and an African American sociolect.

Another exemplary dataset is the publicly available DiPCo dataset. The DiPCo dataset is a relatively small speech data corpus of conversation in a dinner party scenario. These data may be very challenging for a generalist model due to involving the most speakers and the varied acoustic conditions. The length of the DiPCo dataset audio available is 2.7 hours for development and 3.4 hours for testing. The DiPCo dataset may be included in an exemplary domain that includes small sized datasets, conversational audio, and background noise.

In accordance with aspects, domain datasets may undergo preprocessing procedures prior to being used in a parallel expert model training process. For instance, if a domain dataset contains punctuation and/or numbers that a particular model tokenizer cannot encode, the data may be processed with a normalization procedure prior to a model training exercise. Further, in order to expedite a training process, a random subset of samples (e.g., a random subset of 2000 samples, or a percentage (e.g., 10%) of the samples in the domain dataset) may be extracted from the domain dataset and used for a test set. Experiments have shown that using a reduced subset of samples provides resulting performance that differs by less than 3% relative in all measured cases.

Other preprocessing procedures may include splitting domain dataset data by separating speakers. For instance, data may be split among a number of speakers (e.g., separating 5 different speakers) for each of validation and training sets. Audio data may also be divided into segments, e.g., based on provided timings in the transcript, with total length not exceeding a threshold (e.g., 30 seconds), in order to match the expected input length for various models. Where conversations were recorded from a number of devices, the sum of close-talking microphones may be taken as the audio signal.

Aspects may provide a single well-performing generalist model with no loss of performance, through a continual learning paradigm that fine-tunes (i.e., trains) copies of generalist models on corresponding domains in parallel, and then averages the resulting expert models. A parallel expert model training process may include continual learning techniques such as layer-wise learning rate decay (LLRD) and slanted triangular learning rates (STLR). These noted techniques have been shown to provide better model learning and less model forgetting. LLRD may be applied by assigning the highest learning rate to the highest encoder layer and decaying the learning rate of each lower layer by a constant factor (e.g., 0.9). The learning rate of the lowest encoder layer may be applied to any layers not in the encoder (e.g., decoder, output, embedding, etc.). A learning rate schedule, STLR, may peak at roughly 10-20% of the total training time.

Freezing non-encoder layers is roughly equivalent to reducing the overall learning rate in the proposed scheme. If the frozen-layers row are compared with the following row, they may achieve very similar results in most circumstances. It is notable that no benefit to LLRD was observed by adding a loss against the predictions of the original model, a technique called Learning without Forgetting (LwF).

In accordance with aspects, once the fine-tuning (i.e., training) process is done producing domain expert models using corresponding domain datasets, the average of the expert models may be computed. This computation may be a linear interpolation of corresponding model parameters. The computation may include equal weighting on every model. Optimizing algorithms may include stochastic gradient descent (SGD) and extensions thereof such as the Adam optimization algorithm with default hyperparameters other than learning rate. In some aspects, learning rate and LLRD rate may be the only optimized hyperparameters.

FIG. 1 illustrates a block diagram os a system for continual learning in end to-end automatic speech recognition models, in accordance with aspects. System 100 includes parallel model training platform 110, which includes generalist model 120, generalist model 122, and generalist model 124. Each of generalist model 120, generalist model 122, and generalist model 124 may be an open source and/or pre-trained end-to-end speech recognition model as described above. Each of generalist model 120, generalist model 122, and generalist model 124 may be a copy of a same open source and/or pre-trained end-to-end speech recognition model.

Parallel model training platform 110 further includes model training engine 130, model training engine 132, and model training engine 134. Each of model training engine 130, model training engine 132, and model training engine 134 may include, have access to, or be inoperative communication with a domain dataset. For instance, model training engine 130 has access to domain dataset 140, model training engine 132 has access to domain dataset 142, and model training engine 134 has access to domain dataset 144.

Each model training engine of parallel model training platform 110 may fine tune (i.e., train) a corresponding generalist model on a domain dataset. This training may be done in parallel, instead of conventionally training the same generalist model in a serial fashion on each domain dataset. For instance, generalist model 120 may be fine-tuned on domain dataset 140, while generalist model 122 is fined-tuned on domain dataset 142, and generalist model 124 is fine-tuned on domain dataset 144.

Output from a fine-tuning/training exercise executed by a model training engine may be an expert model. Model training engine 130, model training engine 132, and model training engine 134 may execute model training exercises that generate expert models in parallel (i.e., a parallel expert model training process, as described in more detail herein). An expert model, as discussed in more detail herein, is a model that has been fine-tuned using a particular domain dataset. In a parallel expert model training process, model training engine 130 may output expert model 150, model training engine 132 may output expert model 152, and model training engine 134 may output expert model 154. Expert model 150 may be fine-tuned on domain dataset 140, expert model 152 may be fine-tuned on domain dataset 142, and expert model 154 may be fine-tuned on domain dataset 144.

A parallel expert model training process may include a model parameter averaging process that generates an average-of-domain-experts (AoDE) model by computing the average of the expert models. In FIG. 1, each expert model 150, 152, and 154 may be input to model averaging engine 160, which may compute the average of the expert models by executing a model parameter averaging process. Model averaging engine 160 may execute a linear interpolation of the model parameters of each of expert model 150, 152, and 154. The computation may include a non-weighted average, a weighted average, a non-linear combination of the trained parameters, etc. For instance, aspects may include equal weighting on every expert model. Output from model averaging engine 160 is average-of-domain-experts (AoDE) model 170. AoDE model includes the average of each expert model 150, 152, and 154 after a execution of a model parameter averaging process.

Figure 2:
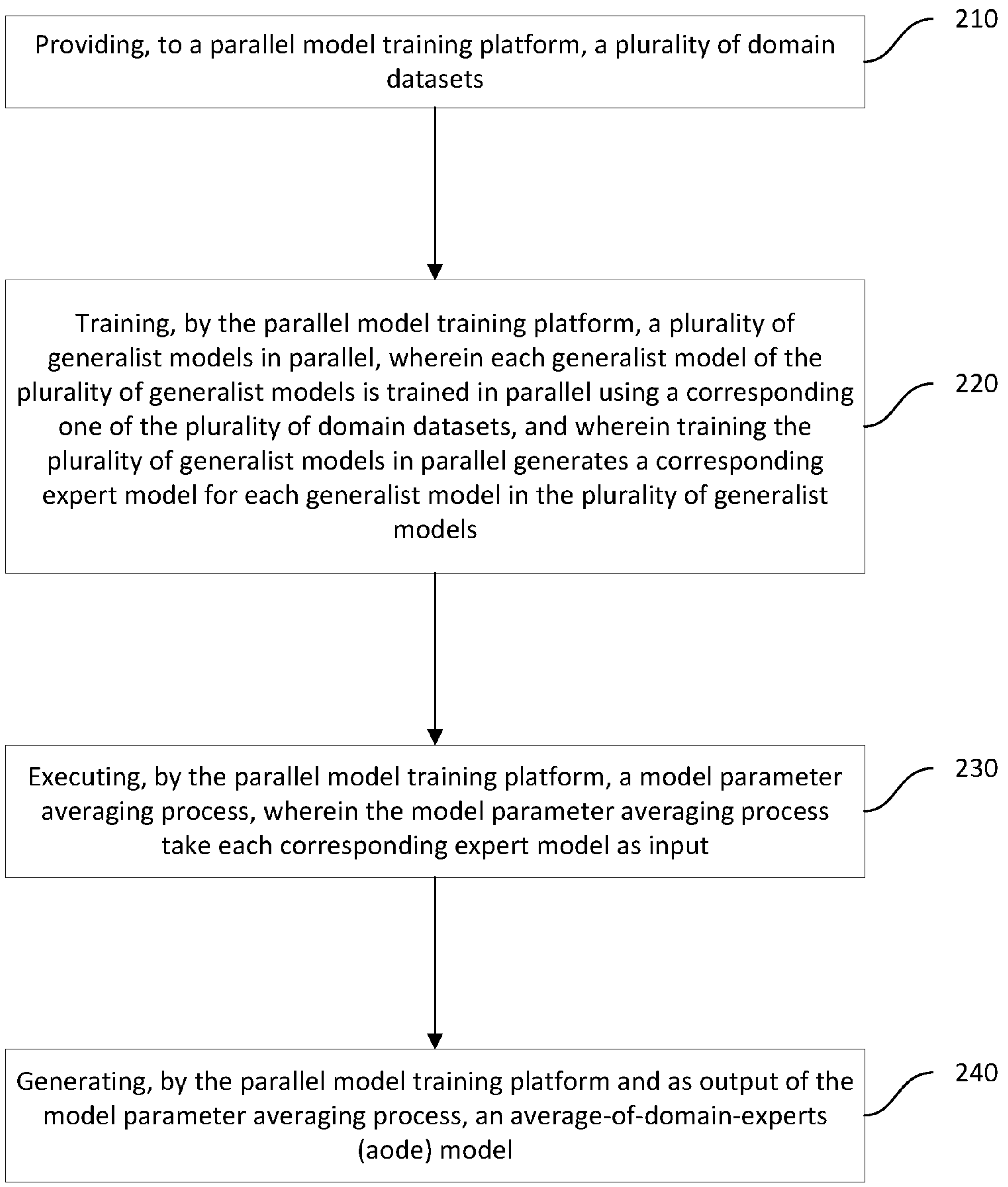
FIG. 2 illustrates a logical flow for continual learning for end to-end automatic speech recognition, in accordance with aspects.

FIG. 2 illustrates a logical flow for continual learning for end to-end automatic speech recognition, in accordance with aspects.

Step 210 includes providing, to a parallel model training platform, a plurality of domain datasets.

Step 220 includes training, by the parallel model training platform, a plurality of generalist models in parallel, wherein each generalist model of the plurality of generalist models is trained in parallel using a corresponding one of the plurality of domain datasets, and wherein training the plurality of generalist models in parallel generates a corresponding expert model for each generalist model in the plurality of generalist models.

Step 230 includes executing, by the parallel model training platform, a model parameter averaging process, wherein the model parameter averaging process take each corresponding expert model as input.

Step 240 includes generating, by the parallel model training platform and as output of the model parameter averaging process, an average-of-domain-experts (AoDE) model.

Figure 3:
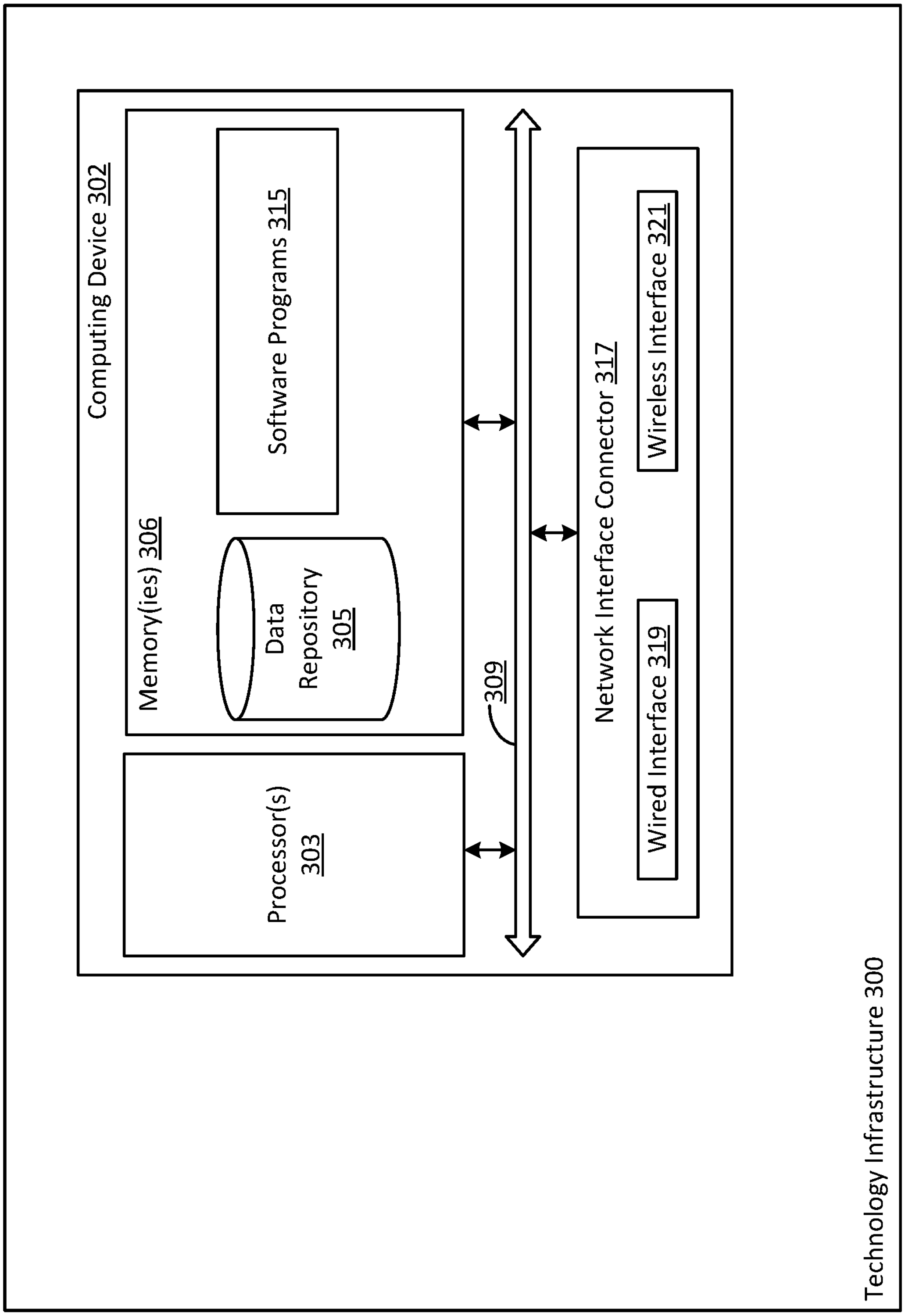
FIG. 3 illustrates a block diagram of a technology infrastructure and computing device for implementing certain aspects of the present disclosure, in accordance with aspects.

FIG. 3 illustrates a block diagram of a technology infrastructure and computing device for implementing certain aspects of the present disclosure, in accordance with aspects. FIG. 3 includes technology infrastructure 300. Technology infrastructure 300 represents the technology infrastructure of an implementing organization. Technology infrastructure 300 may include hardware such as servers, client devices, and other computers or processing devices. Technology infrastructure 300 may include software (e.g., computer) applications that execute on computers and other processing devices. Technology infrastructure 300 may include computer network mediums, and computer networking hardware and software for providing operative communication between computers, processing devices, software applications, procedures and processes, and logical flows and steps, as described herein.

Exemplary hardware and software that may be implemented in combination where software (such as a computer application) executes on hardware. For instance, technology infrastructure 300 may include webservers, application servers, database servers and database engines, communication servers such as email servers and SMS servers, client devices, etc. The term "service" as used herein may include software that, when executed, receives client service requests and responds to client service requests with data and/or processing procedures. A software service may be a commercially available computer application or may be a custom-developed and/or proprietary computer application. A service may execute on a server. The term "server" may include hardware (e.g., a computer including a processor and a memory) that is configured to execute service software. A server may include an operating system optimized for executing services. A service may be a part of, included with, or tightly integrated with a server operating system. A server may include a network interface connection for interfacing with a computer network to facilitate operative communication between client devices and client software, and/or other servers and services that execute thereon.

Server hardware may be virtually allocated to a server operating system and/or service software through virtualization environments, such that the server operating system or service software shares hardware resources such as one or more processors, memories, system buses, network interfaces, or other physical hardware resources. A server operating system and/or service software may execute in virtualized hardware environments, such as virtualized operating system environments, application containers, or any other suitable method for hardware environment virtualization.

Technology infrastructure 300 may also include client devices. A client device may be a computer or other processing device including a processor and a memory that stores client computer software and is configured to execute client software. Client software is software configured for execution on a client device. Client software may be configured as a client of a service. For example, client software may make requests to one or more services for data and/or processing of data. Client software may receive data from, e.g., a service, and may execute additional processing, computations, or logical steps with the received data. Client software may be configured with a graphical user interface such that a user of a client device may interact with client computer software that executes thereon. An interface of client software may facilitate user interaction, such as data entry, data manipulation, etc., for a user of a client device.

A client device may be a mobile device, such as a smart phone, tablet computer, or laptop computer. A client device may also be a desktop computer, or any electronic device that is capable of storing and executing a computer application (e.g., a mobile application). A client device may include a network interface connector for interfacing with a public or private network and for operative communication with other devices, computers, servers, etc., on a public or private network.

Technology infrastructure 300 includes network routers, switches, and firewalls, which may comprise hardware, software, and/or firmware that facilitates transmission of data across a network medium. Routers, switches, and firewalls may include physical ports for accepting physical network medium (generally, a type of cable or wire—e.g., copper or fiber optic wire/cable) that forms a physical computer network. Routers, switches, and firewalls may also have "wireless" interfaces that facilitate data transmissions via radio waves. A computer network included in technology infrastructure 300 may include both wired and wireless components and interfaces and may interface with servers and other hardware via either wired or wireless communications. A computer network of technology infrastructure 300 may be a private network but may interface with a public network (such as the internet) to facilitate operative communication between computers executing on technology infrastructure 300 and computers executing outside of technology infrastructure 300.

FIG. 3 further depicts exemplary computing device 302. Computing device 302 depicts exemplary hardware that executes the logic that drives the various system components described herein. Servers and client devices may take the form of computing device 302. While shown as internal to technology infrastructure 300, computing device 302 may be external to technology infrastructure 300 and may be in operative communication with a computing device internal to technology infrastructure 300.

In accordance with aspects, system components such as a parallel model training platform, a model training engine, a model averaging engine, client devices, servers, various database engines and database services, and other computer applications and logic may include, and/or execute on, components and configurations the same, or similar to, computing device 302.

Computing device 302 includes a processor 303 coupled to a memory 306. Memory 306 may include volatile memory and/or persistent memory. The processor 303 executes computer-executable program code stored in memory 306, such as software programs 315. Software programs 315 may include one or more of the logical steps disclosed herein as a programmatic instruction, which can be executed by processor 303. Memory 306 may also include data repository 305, which may be nonvolatile memory for data persistence. The processor 303 and the memory 306 may be coupled by a bus 309. In some examples, the bus 309 may also be coupled to one or more network interface connectors 317, such as wired network interface 319, and/or wireless network interface 321. Computing device 302 may also have user interface components, such as a screen for displaying graphical user interfaces and receiving input from the user, a mouse, a keyboard and/or other input/output components (not shown).

In accordance with aspects, services, modules, engines, etc., described herein may provide one or more application programming interfaces (APIs) in order to facilitate communication with related/provided computer applications and/or among various public or partner technology infrastructures, data centers, or the like. APIs may publish various methods and expose the methods, e.g., via API gateways. A published API method may be called by an application that is authorized to access the published API method. API methods may take data as one or more parameters or arguments of the called method. In some aspects, API access may be governed by an API gateway associated with a corresponding API. In some aspects, incoming API method calls may be routed to an API gateway and the API gateway may forward the method calls to internal services/modules/engines that publish the API and its associated methods.

A service/module/engine that publishes an API may execute a called API method, perform processing on any data received as parameters of the called method, and send a return communication to the method caller (e.g., via an API gateway). A return communication may also include data based on the called method, the method's data parameters and any performed processing associated with the called method.

API gateways may be public or private gateways. A public API gateway may accept method calls from any source without first authenticating or validating the calling source. A private API gateway may require a source to authenticate or validate itself via an authentication or validation service before access to published API methods is granted. APIs may be exposed via dedicated and private communication channels such as private computer networks or may be exposed via public communication channels such as a public computer network (e.g., the internet). APIs, as discussed herein, may be based on any suitable API architecture. Exemplary API architectures and/or protocols include SOAP (Simple Object Access Protocol), XML-RPC, REST (Representational State Transfer), or the like.

The various processing steps, logical steps, and/or data flows depicted in the figures and described in greater detail herein may be accomplished using some or all of the system components also described herein. In some implementations, the described logical steps or flows may be performed in different sequences and various steps may be omitted. Additional steps may be performed along with some, or all of the steps shown in the depicted logical flow diagrams. Some steps may be performed simultaneously. Some steps may be performed using different system components. Accordingly, the logical flows illustrated in the figures and described in greater detail herein are meant to be exemplary and, as such, should not be viewed as limiting. These logical flows may be implemented in the form of executable instructions stored on a machine-readable storage medium and executed by a processor and/or in the form of statically or dynamically programmed electronic circuitry.

The system of the invention or portions of the system of the invention may be in the form of a "processing device," a "computing device," a "computer," an "electronic device," a "mobile device," a "client device," a "server," etc. As used herein, these terms (unless otherwise specified) are to be understood to include at least one processor that uses at least one memory. The at least one memory may store a set of instructions. The instructions may be either permanently or temporarily stored in the memory or memories of the processing device. The processor executes the instructions that are stored in the memory or memories in order to process data. A set of instructions may include various instructions that perform a particular step, steps, task, or tasks, such as those steps/tasks described above, including any logical steps or logical flows described above. Such a set of instructions for performing a particular task may be characterized herein as an application, computer application, program, software program, service, or simply as "software." In one aspect, a processing device may be or include a specialized processor. As used herein (unless otherwise indicated), the terms "module," and "engine" refer to a computer application that executes on hardware such as a server, a client device, etc. A module or engine may be a service.

As noted above, the processing device executes the instructions that are stored in the memory or memories to process data. This processing of data may be in response to commands by a user or users of the processing device, in response to previous processing, in response to a request by another processing device and/or any other input, for example. The processing device used to implement the invention may utilize a suitable operating system, and instructions may come directly or indirectly from the operating system.

The processing device used to implement the invention may be a general-purpose computer. However, the processing device described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

It is appreciated that in order to practice the method of the invention as described above, it is not necessary that the processors and/or the memories of the processing device be physically located in the same geographical place. That is, each of the processors and the memories used by the processing device may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further aspect of the invention, be performed by a single component. Further, the processing performed by one distinct component as described above may be performed by two distinct components. In a similar manner, the memory storage performed by two distinct memory portions as described above may, in accordance with a further aspect of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity, i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing device what to do with the data being processed.

Further, it is appreciated that the instructions or set of instructions used in the implementation and operation of the invention may be in a suitable form such that the processing device may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing device, i.e., to a particular type of computer, for example. The computer understands the machine language.

Any suitable programming language may be used in accordance with the various aspects of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing device, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing device, utilized to hold the set of instructions and/or the data used in the invention may take on any of a variety of physical forms or transmissions, for example. Illustratively, the medium may be in the form of a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by a processor.

Further, the memory or memories used in the processing device that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing device or machines that are used to implement the invention. As used herein, a user interface includes any hardware, software, or combination of hardware and software used by the processing device that allows a user to interact with the processing device. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing device as it processes a set of instructions and/or provides the processing device with information. Accordingly, the user interface is any device that provides communication between a user and a processing device. The information provided by the user to the processing device through the user interface may be in the form of a command, a selection of data, or some other input, for example.

As discussed above, a user interface is utilized by the processing device that performs a set of instructions such that the processing device processes data for a user. The user interface is typically used by the processing device for interacting with a user either to convey information or receive information from the user. However, it should be appreciated that in accordance with some aspects of the system and method of the invention, it is not necessary that a human user actually interact with a user interface used by the processing device of the invention. Rather, it is also contemplated that the user interface of the invention might interact, i.e., convey and receive information, with another processing device, rather than a human user. Accordingly, the other processing device might be characterized as a user. Further, it is contemplated that a user interface utilized in the system and method of the invention may interact partially with another processing device or processing devices, while also interacting partially with a human user.

It will be readily understood by those persons skilled in the art that the present invention is susceptible to broad utility and application. Many aspects and adaptations of the present invention other than those herein described, as well as many variations, modifications, and equivalent arrangements, will be apparent from or reasonably suggested by the present invention and foregoing description thereof, without departing from the substance or scope of the invention.

Accordingly, while the present invention has been described here in detail in relation to its exemplary aspects, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such aspects, adaptations, variations, modifications, or equivalent arrangements.

The invention claimed is:

1. A method comprising:

providing, to a parallel model training platform, a plurality of domain datasets;

training, by the parallel model training platform, a plurality of generalist models in parallel, wherein each generalist model of the plurality of generalist models is trained in parallel using a corresponding one of the plurality of domain datasets, and wherein training the plurality of generalist models in parallel generates a corresponding expert model for each generalist model in the plurality of generalist models, wherein each of the plurality of generalist models is a copy of a single generalist model;

executing, by the parallel model training platform, a model parameter averaging process, wherein the model parameter averaging process take each corresponding expert model as input and includes an equal-weight linear interpolation of model parameters of each corresponding expert model; and generating, by the parallel model training platform and as output of the model parameter averaging process, an average-of-domain-experts (AoDE) model.

2. The method of claim 1, comprising:

executing, by the model parameter averaging process, a non-linear interpolation of model parameters of each corresponding expert model.

3. The method of claim 1, wherein one of the plurality of domain datasets is a random sampling of a larger domain dataset.

4. The method of claim 1, wherein one of the plurality of domain datasets is divided into time segments that do not exceed a threshold value.

5. A system comprising at least one computer including a processor and a memory, wherein the at least one computer is configured to:

provide, to a parallel model training platform, a plurality of domain datasets;

train, by the parallel model training platform, a plurality of generalist models in parallel, wherein each generalist model of the plurality of generalist models is trained in parallel using a corresponding one of the plurality of domain datasets, and wherein training the plurality of generalist models in parallel generates a corresponding expert model for each generalist model in the plurality of generalist models, wherein each of the plurality of generalist models is a copy of a single generalist model;

execute, by the parallel model training platform, a model parameter averaging process, wherein the model parameter averaging process take each corresponding expert model as input and includes an equal-weight linear interpolation of model parameters of each corresponding expert model; and generate, by the parallel model training platform and as output of the model parameter averaging process, an average-of-domain-experts (AoDE) model.

6. The system of claim 5, wherein the at least one computer is configured to:

execute, by the model parameter averaging process, a non-linear interpolation of model parameters of each corresponding expert model.

7. The system of claim 5, wherein one of the plurality of domain datasets is a random sampling of a larger domain dataset.

8. The system of claim 5, wherein one of the plurality of domain datasets is divided into time segments that do not exceed a threshold value.

9. A non-transitory computer readable storage medium, including instructions stored thereon, which instructions, when read and executed by one or more computer processors, cause the one or more computer processors to perform steps comprising:

providing, to a parallel model training platform, a plurality of domain datasets;

training, by the parallel model training platform, a plurality of generalist models in parallel, wherein each generalist model of the plurality of generalist models is trained in parallel using a corresponding one of the plurality of domain datasets, and wherein training the plurality of generalist models in parallel generates a corresponding expert model for each generalist model in the plurality of generalist models, wherein each of the plurality of generalist models is a copy of a single generalist model;

executing, by the parallel model training platform, a model parameter averaging process, wherein the model parameter averaging process takes each corresponding expert model as input and includes an equal-weight linear interpolation of model parameters of each corresponding expert model; and generating, by the parallel model training platform and as output of the model parameter averaging process, an average-of-domain-experts (AoDE) model.

10. The non-transitory computer readable storage medium of claim 9, comprising:

executing, by the model parameter averaging process, a non-linear interpolation of model parameters of each corresponding expert model.

11. The non-transitory computer readable storage medium of claim 9, wherein one of the plurality of domain datasets is a random sampling of a larger domain dataset.

* * * * *